SHELDON P. GILBERT.
Improvement in Combined Ligatures, Protectors, and Fertilizing Bags for Fruit Trees.
No. 116,001. Patented June 13, 1871.
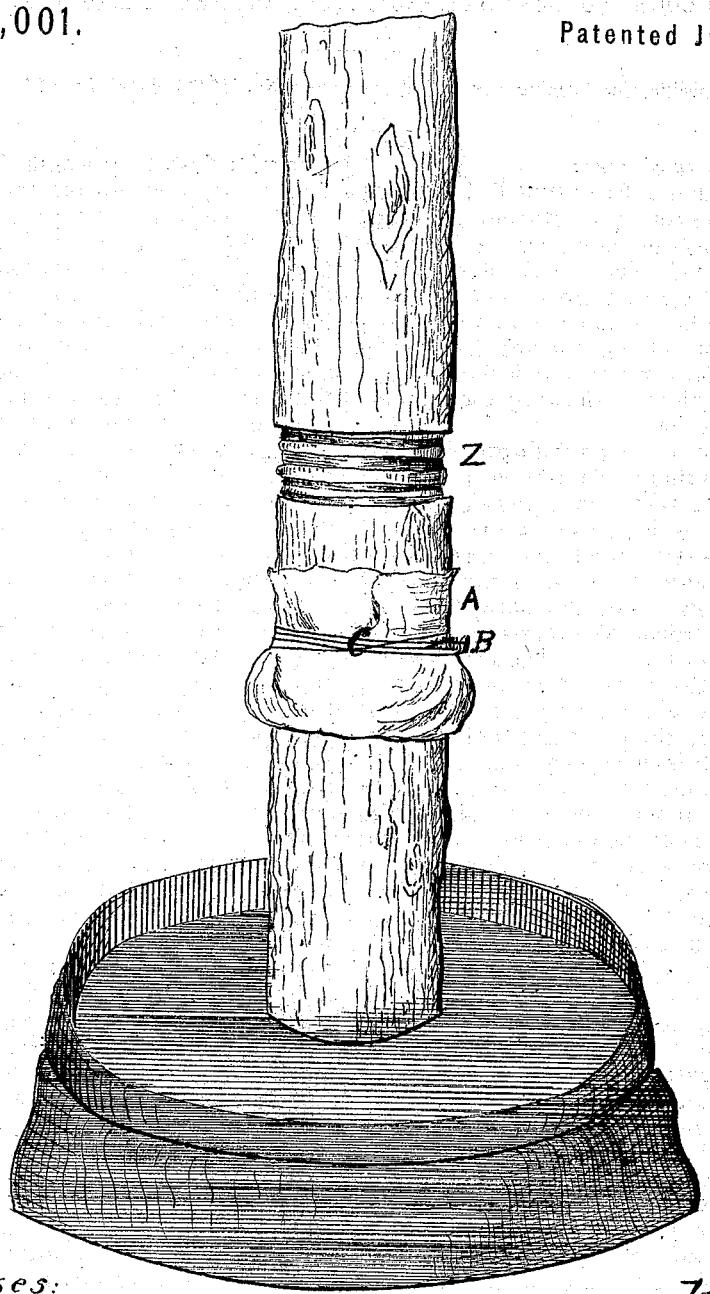

116,001

UNITED STATES PATENT OFFICE.

SHELDON P. GILBERT, OF RACINE, WISCONSIN.

IMPROVEMENT IN COMBINED LIGATURES, PROTECTORS, AND FERTILIZING BAGS FOR FRUIT-TREES.

Specification forming part of Letters Patent No. 116,001, dated June 13, 1871.

*To all whom it may concern:*

Be it known that I, SHELDON P. GILBERT, of Racine, in the county of Racine and State of Wisconsin, have invented certain Improvements in Combined Ligature, Protector, and Fertilizing Bag for Fruit-Trees; and I declare the following to be a full, clear, and exact description thereof, reference being had to the accompanying drawing, in which the figure is a section of a fruit-tree, showing the application of my invention.

It is well known among fruit-growers that the fluid circulation of fruit-trees is, first, in the spring, from the roots upward through the cellular tissues or pores of the wood, and in due time takes up and perfects the full-grown leaf. There is then a counter-current or downward flow under the bark, having a deposit which hardens and forms an addition to the diameter of the tree. The surplus fluid passes down to the roots to form new rootlets, which elaborate and take up an additional quantity of fluid, thereby increasing the upward flow, which is constantly going on. This additional nutriment produces the superfluous bark, which, if not needed to increase the size of the tree, is at the expense of the fruit.

To prevent excessive root and limb growth while utilizing the vitality of the tree a simple wire ligature has been used but not generally adopted, because the wire, as the tree increases in size, becomes embedded in the latter, and cannot be removed without tearing off or fracturing the bark to such an extent as to nearly, if not quite, girdle the tree. The object of the ligature is to partially obstruct the downward flow of sap, to utilize its nutritious properties in the tree-top for the production of fruit-buds for the next year's fruitage, as well as to mature and harden any spongy growth of young wood.

My invention consists in a shield of cloth, or other soft, pliable material, folded in such a manner as to form a bag or double belt, in which is placed any suitable fertilizer, and interposed between the wire ligature above mentioned and the tree.

The object of this construction is threefold —to wit: first, to prevent the wire from cutting through or injuring the bark; secondly, to produce a suitable protector, so disposed as to form an effectual barrier against the army and other worms passing into the tree-top; and thirdly, to form a suitable receptacle for a fertilizer, which shall be distributed only when the shield is saturated by rains, or the application of water by hand and wash down the bark of the tree into the adjacent ground as a fertilizer for the roots and as a destructive agent for insect larvæ and funguses deposited upon the tree-bark. This disposition of the fertilizer is the most economical, inasmuch as it is protected against waste and exposure by the shield, and, when distributed by water, first benefits the tree-bark before passing to the roots.

My invention does not consist in the employment of any one of these elements, but in the combination, in one device, of the ligature, protector, and fertilizer.

In carrying out the invention I form the shield A of a strip of cloth about three inches wide, and of sufficient length to encircle the tree once, with its ends overlapping somewhat. It is first folded longitudinally, and within the fold is placed a considerable quantity of the fertilizer, composed, preferably, of one gallon of soft soap, one-half pound of sulphur, one-quarter pound of carbonate of ammonia, and sufficient lime to reduce the whole mass to a plastic condition. The shield is then placed around the tree and the two overlapping ends secured to the tree by a nail, B, as shown in the drawing. C is the wire ligature passing five or six times around the upper edge or middle of the shield, with its ends firmly secured to the nail, as shown. It is applied by first fastening one end to the nail, and, after being wound about the shield, it is again fastened to the nail and cut or broken off. The shield, when in place, forms a fertilizing-bag, bulging out at its lower edge, as shown in the drawing.

My improvement is applicable to fruit-trees at any time between the first of March and the first of June. If the tree has attained the desired size it need not be removed until October; but if the tree requires more growth it should be removed by the first of September.

Having thus described my invention, what I claim as new, and desire to secure by Letters Patent, is—

The combined ligature, protector, and fertilizing-bag for fruit-trees, consisting of the folded shield A, containing a fertilizer secured to a tree by the nail B and wire-ligature C, as herein described, for the purposes specified.

SHELDON P. GILBERT.

Witnesses:
G. H. FROST,
E. A. ELLSWORTH.